United States Patent
Lam (10) Patent No.: US 11,171,965 B2
(45) Date of Patent: Nov. 9, 2021

(54) GENERATED AUDIO SIGNAL GRANTING ACCESS TO RESOURCE

(71) Applicant: Microsoft Technology Licensing, LLC, Redmond, WA (US)

(72) Inventor: Wing Hong Michael Lam, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 108 days.

(21) Appl. No.: 16/392,392

(22) Filed: Apr. 23, 2019

(65) Prior Publication Data

US 2020/0344241 A1  Oct. 29, 2020

(51) Int. Cl.
*H04L 29/06* (2006.01)
*G10L 25/51* (2013.01)

(52) U.S. Cl.
CPC ............ *H04L 63/104* (2013.01); *G10L 25/51* (2013.01)

(58) Field of Classification Search
None
See application file for complete search history.

(56) References Cited

U.S. PATENT DOCUMENTS

| | | | |
|---|---|---|---|
| 9,076,006 B1 * | 7/2015 | Saylor | G06F 21/606 |
| 9,094,453 B2 | 7/2015 | Ady et al. | |
| 9,591,148 B2 | 3/2017 | Dimitroff et al. | |
| 9,992,241 B1 | 6/2018 | Huang et al. | |
| 2002/0075304 A1 | 6/2002 | Thompson et al. | |
| 2004/0249902 A1 * | 12/2004 | Tadayon | G06F 16/10 709/207 |
| 2011/0238192 A1 | 9/2011 | Shah et al. | |
| 2012/0198531 A1 * | 8/2012 | Ort | H04W 12/06 726/7 |
| 2013/0106976 A1 | 5/2013 | Chu et al. | |
| 2014/0156053 A1 * | 6/2014 | Mahdavi | G06Q 50/04 700/119 |

(Continued)

OTHER PUBLICATIONS

Lowensohn (Paul Lowensohn, "Passpack now lets you securely share your log-ins", May 2019, found at https://www.cnet.com/news/passpack-now-lets-you-securely-share-your-log-ins/). (Year: 2019).*

(Continued)

*Primary Examiner* — Piotr Poltorak
(74) *Attorney, Agent, or Firm* — Workman Nydegger (57) ABSTRACT

A transmitting computing system's use of an audio signal to grant users of receiving computing systems access to a resource. These other receiving systems are in close proximity to the transmitting system so that they hear the audio signal on their microphones. Upon receiving the audio signal, a given receiving system sends a message representing that received audio signal to a resource server system that regulates access to that resource. The transmitting system and resource server system may have coordinated that the ability to send such a message is sufficient for access to be granted to the sender of that message. The resource server system thus determines that the message correlates to the resource, and thereby grants the user of the receiving system access to the resource. Thus, the principles described herein allow for an actual audio signal to efficiently grant resource access to other proximate users.

25 Claims, 7 Drawing Sheets

(56) References Cited

U.S. PATENT DOCUMENTS

| | | | |
|---|---|---|---|
| 2015/0206139 A1* | 7/2015 | Lea | G06Q 20/02 |
| | | | 705/44 |
| 2015/0331660 A1 | 11/2015 | Kalampoukas et al. | |
| 2018/0053126 A1* | 2/2018 | Weaver | G06Q 10/067 |
| 2018/0144748 A1 | 5/2018 | Leong | |
| 2019/0069062 A1 | 2/2019 | Taniguchi et al. | |

OTHER PUBLICATIONS

Raggett (Dave Raggett, "Getting started with HTM", May 2005, found at https://www.w3.org/MarkUp/Guide/) (Year: 2005).*

"International Search Report and Written Opinion Issued in PCT Application No. PCT/US2020/025579", dated Jun. 15, 2020, 11 Pages.

"Application as Filed in U.S. Appl. No. 15/712,620", filed Sep. 22, 2017, 38 Pages.

* cited by examiner

GENERATED AUDIO SIGNAL GRANTING ACCESS TO RESOURCE

BACKGROUND

Human beings are a unique species in our ability to communicate one with another. Our ability to effectively share information and mutually exchange ideas contributes to almost every aspect of the advancement and happiness of humankind. Relationships are strengthened. Technological achievement is accelerated. Knowledge and wisdom can be passed from one generation or person to another. We learn from the perspectives, experiences, and knowledge of others. We work more efficiently and collaboratively.

Notwithstanding, human beings are imperfect at communicating, and thus ideas are sometimes lost, or misunderstandings can occur. Thus, we sometimes fall short of our full potential. Computing and network technologies provide additional avenues for sharing information and ideas, thereby increasing the available modalities of communication and information sharing. For instance, we can now participate in and record online meetings, share data, collaborate on documents and projects passing control back and forth, draw on electronic whiteboards, and so forth. In order to do that, it is necessary to share resources of various types. For some types of communication, it is further required to gather all participants into a common computer-enabled workspace.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to one computing system (a transmitting computing system) using an audio signal to grant users of one or more other computing systems (a receiving computing system) access to a resource. These other receiving computing system(s) are in close proximity to the transmitting computing system. Accordingly, a given receiving computing system can detect the audio signal transmitted by the transmitting computing system. Thus, the principles described herein allow for an actual audio signal (i.e., the vibration of air) to quickly and conveniently grant resource access to other users within the sound of the transmitting computing system.

From a perspective of the transmitting computing system, upon determining that access to a resource is to be granted to others, the transmitting computing system formulates a representation of an audio signal that corresponds to access to the resource. The transmitting computing system then causes a speaker to emit the audio signal in the presence of the receiving computing system(s).

From a perspective of a receiving computing system, in response to receiving an audio signal from its microphone, the receiving computing system formulates a message that is structured to represent to a resource server computing system that the receiving computing system has received the audio signal. This receiving computing system then sends the message to a resource server computing system that regulates access to the resource. The transmitting computing system and the resource server computing system may have coordinated that the ability to send such a message is sufficient for access to be granted to the sender of that message. In other words, access to a resource is granted based on the very fact that the receiving computing system heard the audio signal. The resource server computing system then grants a user of the receiving computing system access to a resource that corresponds to the audio signal.

The user experience associated with the granting of access to the resource is simplified greatly. The user of the transmitting computing system simply triggers the transmitting computing system to send the audio signal, where that user need not be concerned with the mechanisms that are used behind the scenes to formulate and send that audio signal. The process is simplified for the user of the receiving computing system as well. That user merely makes sure that their microphone is enabled, and then simply waits a few moments for access to be granted by virtue of their merely being in the audible presence of the transmitting computing system. Thus, the principles described herein make it much more convenient to share information and communicate one with another using additional communication modalities offered by computing and network technologies.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to one computing system (a transmitting computing system) using an audio signal to grant users of one or more other computing systems (a receiving computing system) access to a resource. These other receiving computing system(s) are in close proximity to the transmitting computing system. Accordingly, a given receiving computing system can detect the audio signal transmitted by the transmitting computing system. Thus, the principles described herein allow for an actual audio signal (i.e., the vibration of air) to quickly and conveniently grant resource access to other users within the sound of the transmitting computing system.

From a perspective of the transmitting computing system, upon determining that access to a resource is to be granted to others, the transmitting computing system formulates a representation of an audio signal that corresponds to access to the resource. The transmitting computing system then causes a speaker to emit the audio signal in the presence of the receiving computing system(s). In this description, the modifier "transmitting" is used to modify the term "computing system" to represent that the transmitting computing system sounds the audio signal, and the modifier "receiving" is used to modify the term "computing system" to represent that the receiving computing system hears the audio signal. This is due to the importance of the audio signal to the principles described herein. The transmitting computing system can receive and transmit network communications and perform other logic, while the receiving computing system can receive and transmit network communications and perform other logic.

From a perspective of a receiving computing system, in response to receiving an audio signal from its microphone, the receiving computing system formulates a message that is structured to represent to a resource server computing system that the receiving computing system has received the audio signal. This receiving computing system then sends the message to a resource server computing system that regulates access to the resource. The transmitting computing system and the resource server computing system may have coordinated that the ability to send such a message is sufficient for access to be granted to the sender of that message. In other words, access to a resource is granted based on the very fact that the receiving computing system heard the audio signal. The resource server computing system then grants a user of the receiving computing system access to a resource that corresponds to the audio signal.

The user experience associated with the granting of access to the resource is simplified greatly. The user of the transmitting computing system simply triggers the transmitting computing system to send the audio signal, where that user need not be concerned with the mechanisms that are used behind the scenes to formulate and send that audio signal. The process is simplified for the user of the receiving computing system as well. That user merely makes sure that their microphone is enabled, and then simply waits a few moments for access to be granted by virtue of their merely being in the audible presence of the transmitting computing system. Thus, the principles described herein make it much more convenient to share information and communicate one with another using additional communication modalities offered by computing and network technologies.

The principles described herein enable an endless variety of user experiences not now possible. For instance, a professor might instruct the students in the classroom to enable the microphones on their personal devices, so that the professor's device can emit a sound that causes the students to be able to access online interactive study aids for the semester. An employee of a corporation may grant guest wi-fi access to visitors currently in the same room by emitting a sound from the employee's portable device. A network administrator might grant printer access or a network drive by issuing a sound from a portable device, which is received by employee workstations within hearing range. Individuals within a room may be seamlessly admitted into an online meeting or workspace. The possibilities are limitless.

Figure 1:
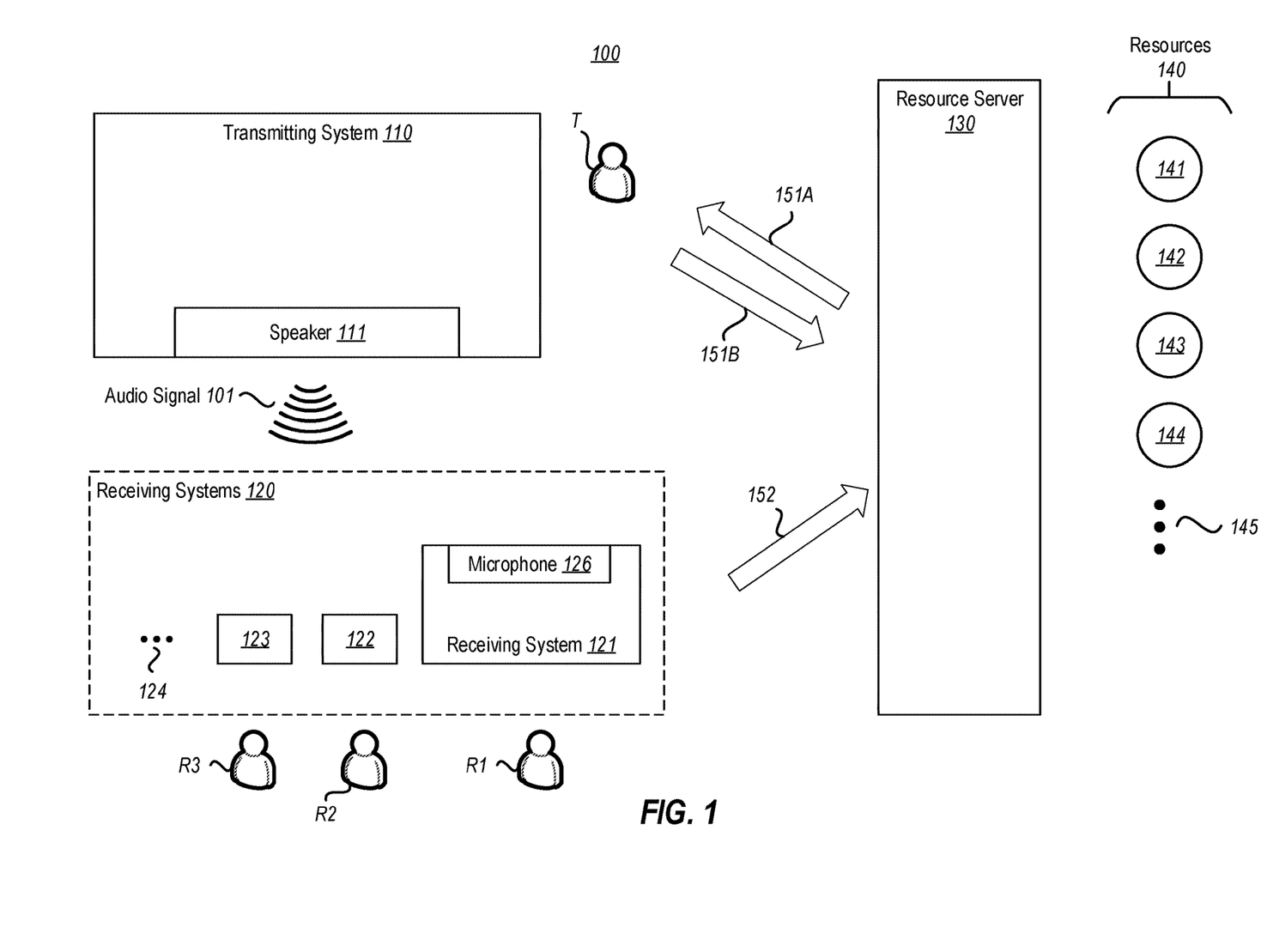
FIG. 1 illustrates a network environment in which the principles described herein may be employed, which includes a transmitting computing system that transmits an audio signal, receiving computing systems that receive the audio signal, and a resource server computing system that grants access to resources based on the receiving computing systems demonstrating that they received the audio signal.

FIG. 1 illustrates a network environment 100 in which the principles described herein may be employed. The network environment 100 includes a transmitting computing system 110 and receiving computing systems 120. Although the receiving computing systems 120 are illustrated as including three receiving computing systems 121, 122 and 123, the ellipsis 124 represents that there may be any whole number (one or more) of receiving computing systems 120 within the network environment 100. In the illustrated example, the transmitting computing system 110 has a user (identified as "user T"), and each of the receiving computing systems 120 also has a respective user (identified as "user R1" for receiving computing system 121, "user R2" for receiving computing system 122, and "user R3" for receiving computing system 123).

The receiving computing systems 120 are within such close proximity with the transmitting computing system 110 such that the receiving computing systems 120 can each hear (via a microphone) an audio signal that is sounded (via a speaker) by the transmitting computing system. For instance, the transmitting computing system 110 includes a speaker 111 that emits an audio signal 101 that may be received by a microphone 126 of the receiving computing system 121. Similarly, the audio signal 101 may likewise be received by microphones (not shown) of any other of the receiving computing systems 120. For instance, the receiving computing systems 120 may be in the same room as the transmitting computing system 110. The transmitting computing system 110 and the receiving computing systems 120 may each be portable computing systems, and may be structured as described below for the computing system 800 of FIG. 8.

In one embodiment, the audio signal 101 is at least partially in the audible range of 20 hertz (Hz) to 20 kilohertz (kHz). This allows the users of the transmitting and receiving computing systems to use their own hearing to detect that the audio signal has been sent. Thus, the users know that access will soon be granted to the resource. In other embodiments, some or all of the audio signal may be outside of the audible range (e.g., below 20 Hz and/or above 20 kHz).

The network environment 100 also includes a resource server computing system 130 that regulates access to a number of resources 140. As an example, FIG. 1 illustrates that the resources 140 includes four resources 141, 142, 143 and 144. However, the ellipsis 145 represents that the resource server computing system 130 may manage any number of resources. The resource server computing system 130 may be structured as described below for the computing system 800 of FIG. 8.

In one embodiment, there is a distinct audio signal that is used to grant access to each of the resources 140. Thus, the receipt of one audio signal may allow the receiving computing system access to resource 141, the receipt of another audio signal may allow the receiving computing system access to resource 142, the receipt of a third audio signal may allow the receiving computing system access to resource 143, and the receipt of a fourth audio signal may allow the receiving computing system access to resource 144.

The resources 140 might each be a hardware resource, data, code, an account, a workspace, or any other resource. Examples of hardware resources include a storage drive or an output device (such as a printer or display). Examples of data might be a credential, configuration settings, a database, media (such as images, video, audio, or the like), a mapping or pointer to other resources (such as a virtual drive), or any other data. Examples of code include software or a web service. An example of an account might be a cloud storage account, an e-mail account, or any other account. An example of a workspace might be an online meeting, or membership in an electronic collaboration account having at least one modality of communication between users. The resource may also be membership in a group, such that accessing the resource includes joining a user into the group. As an example, the group might be an online meeting, an electronic collaboration account, a mailing list, a social media group, a chat session, a game, or any other group.

The principles described herein allow a user of one computing system to share access to a resource to other users of respective receiving computing systems by transmitting an audio signal to those receiving computing systems. As an example used throughout this description, suppose that the user T of transmitting computing system 110 owns resource 141 in the sense that the user T has a right to permit at least partial access to the resource 141 to other users, at least under some circumstances. In this example, user T will share access to the resource 141 with users R1 through R3 by sounding the audio signal 101 to the respective receiving computing systems 121 through 123.

Figure 2:
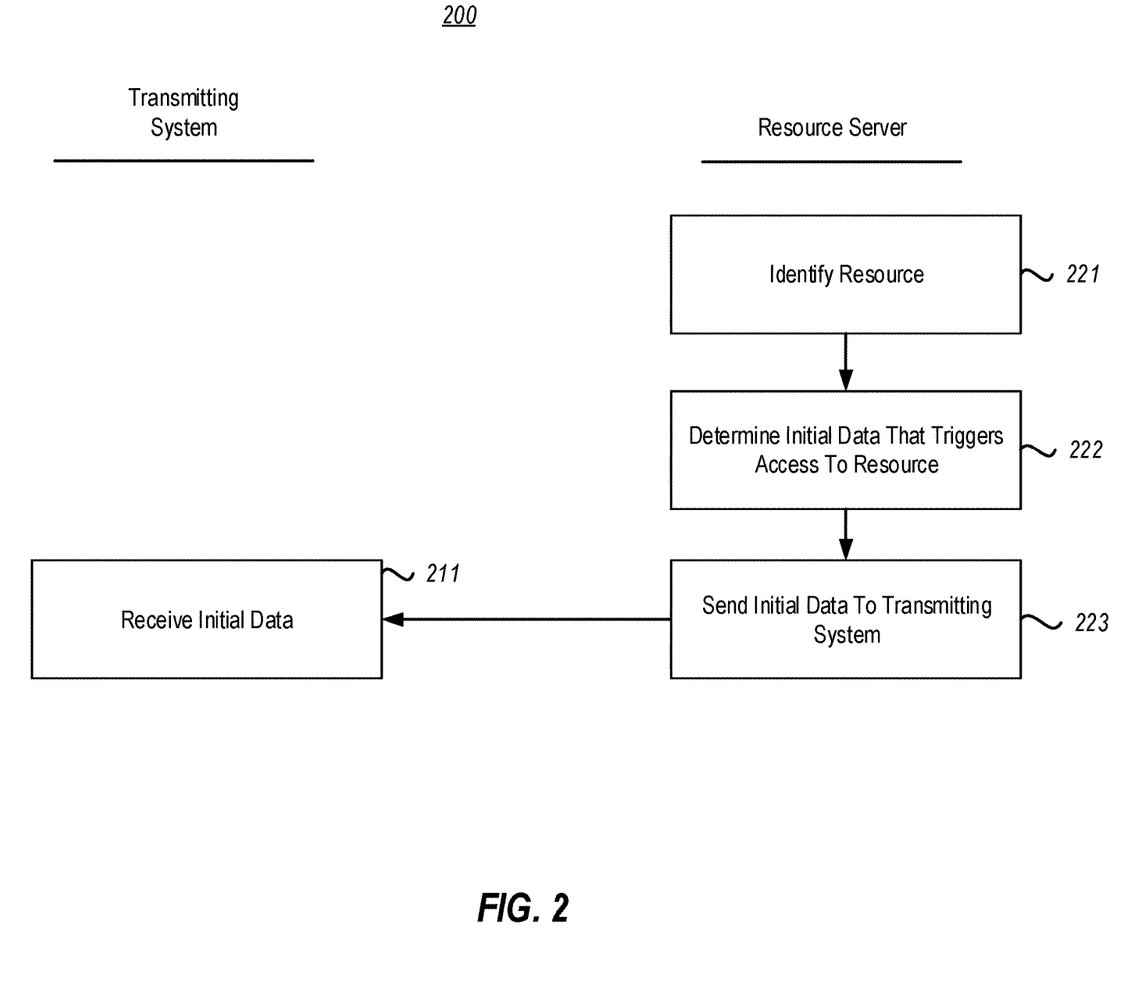
FIG. 2 illustrates a flowchart of a first method for the transmitting computing system and the resource server computing system performing preliminary coordination, which may be in preparation for performing the method of FIG. 4.

FIG. 2 illustrates a flowchart of a first method 200 for the transmitting computing system that transmits the audio signal (e.g., transmitting computing system 110 in FIG. 1) and the resource server computing system that regulates access to the resource (e.g., resource server computing system 130 in FIG. 1) performing preliminary coordination. This preliminary coordination is in preparation for the transmitting computing system sounding an audio signal to receiving computing systems whose users are to be granted access to a resource. Acts performed by the transmitting computing system that is to sound the audio signal (e.g., transmitting computing system 110 in FIG. 1) are listed in the left column of FIG. 2 under the heading "Transmitting System". Acts performed by the resource server computing system that manages the resource (e.g., resource server computing system 130 in FIG. 1) are listed in the right column of FIG. 2 under the heading "Resource Server".

In this first method 200, the resource server computing system defines initial data that corresponds to access data to be provided by the receiving computing system that receives the audio signal (e.g., receiving computing system 121 in FIG. 1) to the resource server computing system in order to be granted access to the resource (e.g., resource 141 in FIG. 1). The method 200 will be described with respect to FIG. 1, and with particular reference to arrow 151A in which the resource server computing system 130 transmits initial data to the transmitting computing system 110.

The resource server computing system first identifies which resource the transmitting computing system is to grant access to (act 221). Referring to FIG. 1, suppose that the resource server computing system 130 determines that the transmitting computing system 110 (or its user T) wishes to grant access to resource 141. As an example, the transmitting computing system 110 itself may have sent to the resource server computing system 130 a request to grant access to resource 141. Upon verifying that the user T or its computing system 110 is authorized to grant such access, the resource server computing system 130 may identify resource 141 as the resource to which access is to be granted.

The resource server computing system then defines or determines initial data that will trigger access to the identified resource (act 222). This initial data is structured such that, when interpreted by the transmitting computing system, the transmitting computing system is caused to generate and sound an audio signal that corresponds to the resource to which access is to be granted. This resource server computing system then sends this initial data to the transmitting computing system that is to sound the audio signal (act 223), whereupon that initial data is received by the transmitting computing system that is to sound the audio signal (act 211). Referring to FIG. 1, suppose that the resource server computing system 130 sends initial data corresponding to the resource 141 to the transmitting computing system 110, as represented by arrow 151A.

This initial data might be a direct digital representation of the audio signal (e.g., audio signal 101) that is to be sounded from the transmitting computing system (e.g., transmitting computing system 110) to the receiving computing systems (e.g., receiving computing systems 120). Alternatively, this initial data may be data that the transmitting computing system may use to derive the audio signal that is to be sounded.

Figure 5:
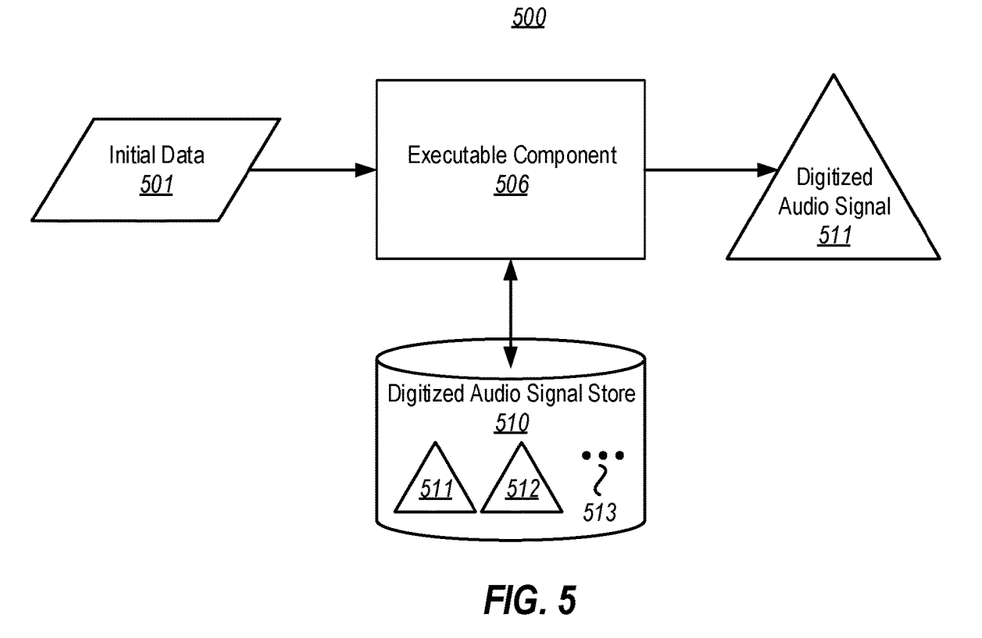
FIG. 5 illustrates a dataflow in which an executable component derives a digitized audio signal using initial data, which may be executed on the transmitting computing system.

To illustrate, FIG. 5 illustrates a dataflow 500 in which an executable component 506 derives digitized audio signal 511 using initial data 501. The executable component 506 may be present on the transmitting computing system 110 of FIG. 1. For instance, if the transmitting computing system 110 was a computing system such as the computing system 800 of FIG. 8, the executable component 506 may be structured as described below for the executable component 806.

In one embodiment, the executable component uses the initial data 501 to look up an appropriate digitized audio signal from a digitized audio signal store 510. In FIG. 5, the digitized audio signal store 510 is illustrated as including digitized audio signals 511, 512, amongst potentially many others as represented by the ellipsis 513. The digitized audio signal store 510 may be present on the transmitting computing system, and/or may be partially or fully stored at another location (such as a cloud storage service or even the resource server computing system itself).

For instance, suppose that the initial data might be binary 00 to trigger access to resource 141, binary 01 to trigger access to resource 142, binary 10 to trigger access to resource 143, and binary 11 to trigger access to resource 144. In that case, initial data of 00 might cause the transmitting computing system to look up a digital representation of an audio signal that may be used to access resource 141, initial data of 01 might cause the transmitting computing system to look up a digital representation of another audio signal that may be used to access resource 142, and so forth.

Figure 3:
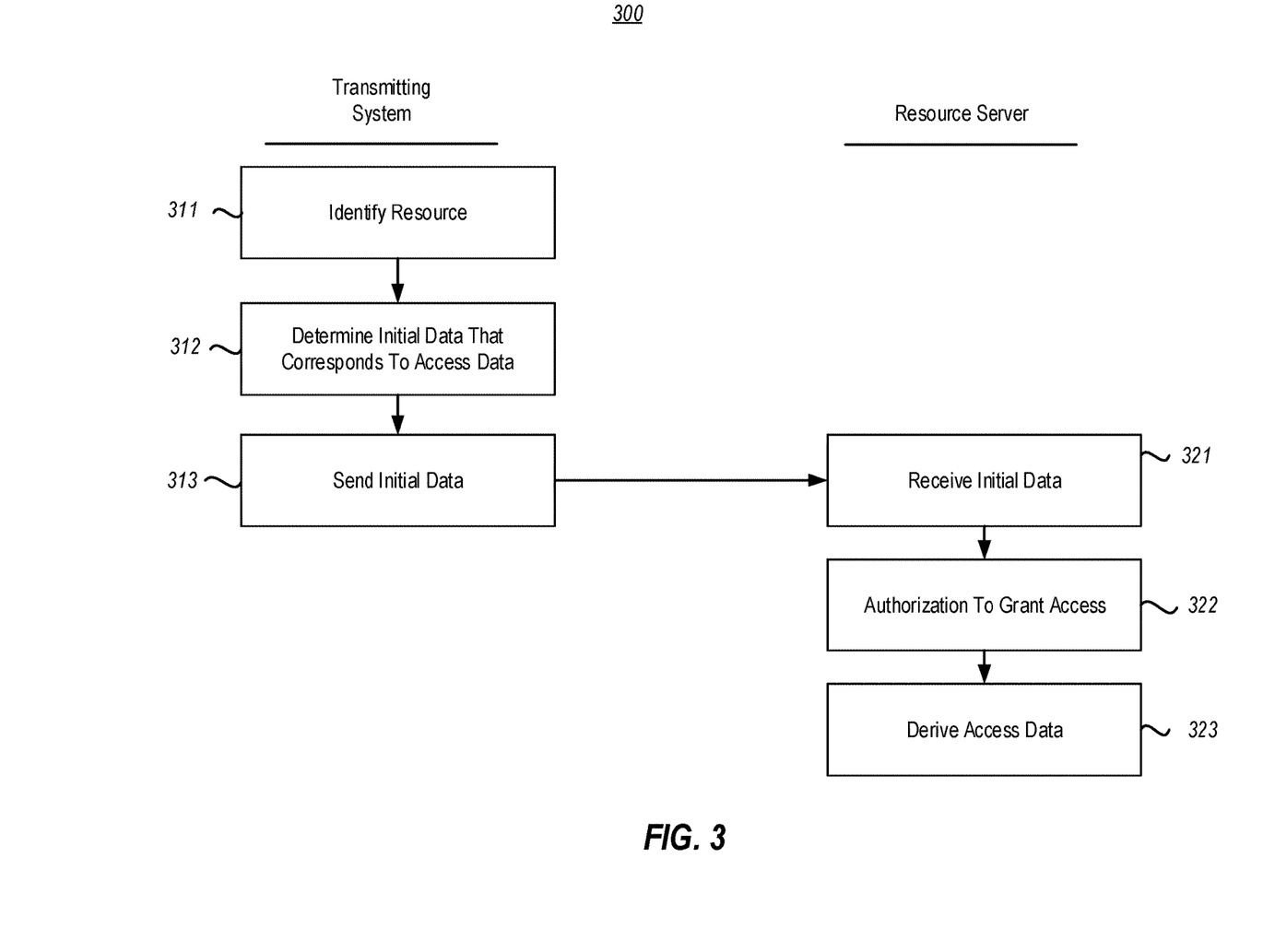
FIG. 3 illustrates a flowchart of a second method for the transmitting computing system and the resource server computing system performing preliminary coordination, which may be in preparation for performing the method of FIG. 4.

FIG. 3 illustrates a flowchart of a second method 300 for the transmitting computing system that transmits the audio signal (e.g., transmitting computing system 110 in FIG. 1)

and the resource server computing system that regulates access to the resource (e.g., resource server computing system 130 in FIG. 1) performing preliminary coordination. In this second method 300, the transmitting computing system that is to sound an audio signal defines initial data that corresponds to access data to be provided by the receiving computing system that receives the audio signal (e.g., receiving computing system 121 in FIG. 1) to the resource server computing system in order to be granted access to the resource (e.g., resource 141 in FIG. 1). The method 300 will be described with respect to FIG. 1, and with particular reference to arrow 151B in which the transmitting computing system 110 transmits the initial data to the resource server computing system 130.

The transmitting computing system first identifies which resource the transmitting computing system is to grant access to (act 311). Referring to FIG. 1, suppose that the transmitting computing system 110 (or its user T) is to grant access to resource 141. The transmitting computing system then defines or determines initial data that corresponds to access data that will permit access to the identified resource (act 312).

Figure 6:
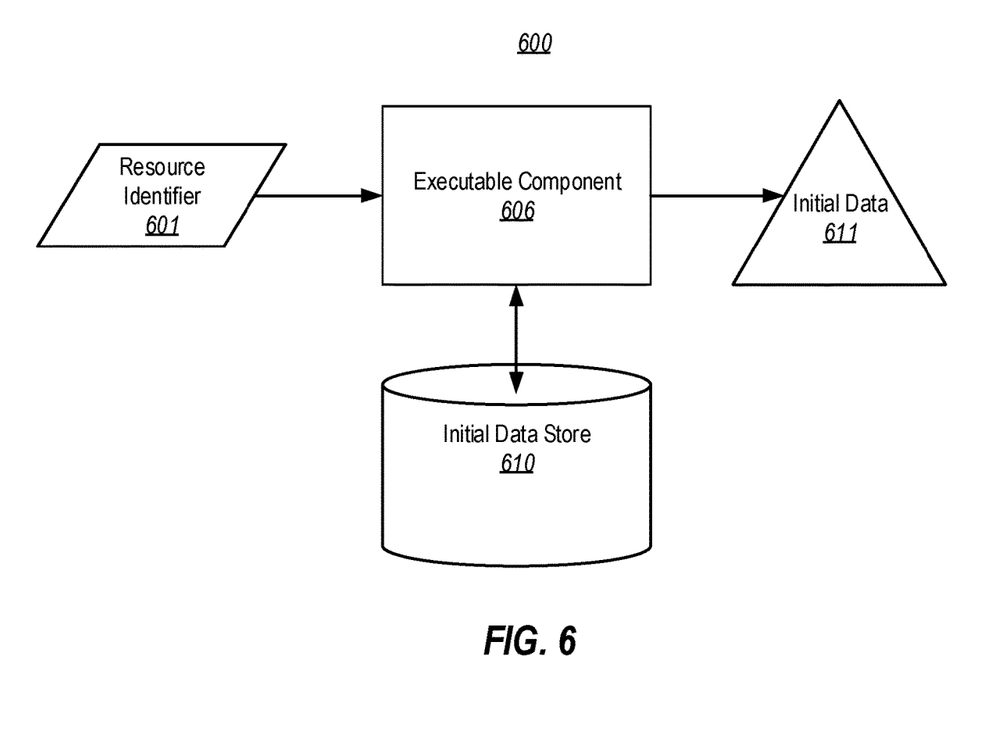
FIG. 6 illustrates a dataflow in which an executable component identifies initial data using the resource identity of the resource to which access is to be granted, which may be executed on the transmitting computing system.

To illustrate, FIG. 6 illustrates a dataflow 600 in which an executable component 606 identifies initial data 611 using the resource identifier 601 of the resource that is to be granted access. Once again, the executable component 606 may be present on the transmitting computing system 110 of FIG. 1, and may be structured as described below for the executable component 806. In one embodiment, the executable component uses the resource identifier 601 to look up appropriate initial data 611 from an initial data store 610, which may be present also on the transmitting component system, and/or may be partially or fully stored at another location. Alternatively, or in addition, part or all of the initial data may be calculated from the resource identifier 601 itself.

This initial data is structured such that, when interpreted by the resource server computing system, the resource server computing system is caused to determine the access data that may be used to permit access to the identified resource. The transmitting computing system then sends this initial data to the resource server computing system (act 313), whereupon that initial data is received by the resource server computing system (act 321). Referring to FIG. 1, suppose that the transmitting computing system 110 sends initial data corresponding the access data for the resource 141 to the resource server computing system 130, as represented by arrow 151B.

The resource server computing system verifies that the user T or its computing system 110 is authorized to grant such access to the resource (act 322), and derives access data from the initial data (act 323). This initial data might be the access data itself that is to be provided by the receiving computing systems (e.g., receiving computing system 121) in order to access the resource (e.g., resource 141). In that case, the deriving of the access data from the initial data (act 323) is a trivial process. Alternatively, this initial data may be different than the access data requiring the resource server computing system to perform some processing to determine the access data to be used to access the resource.

Figure 4:
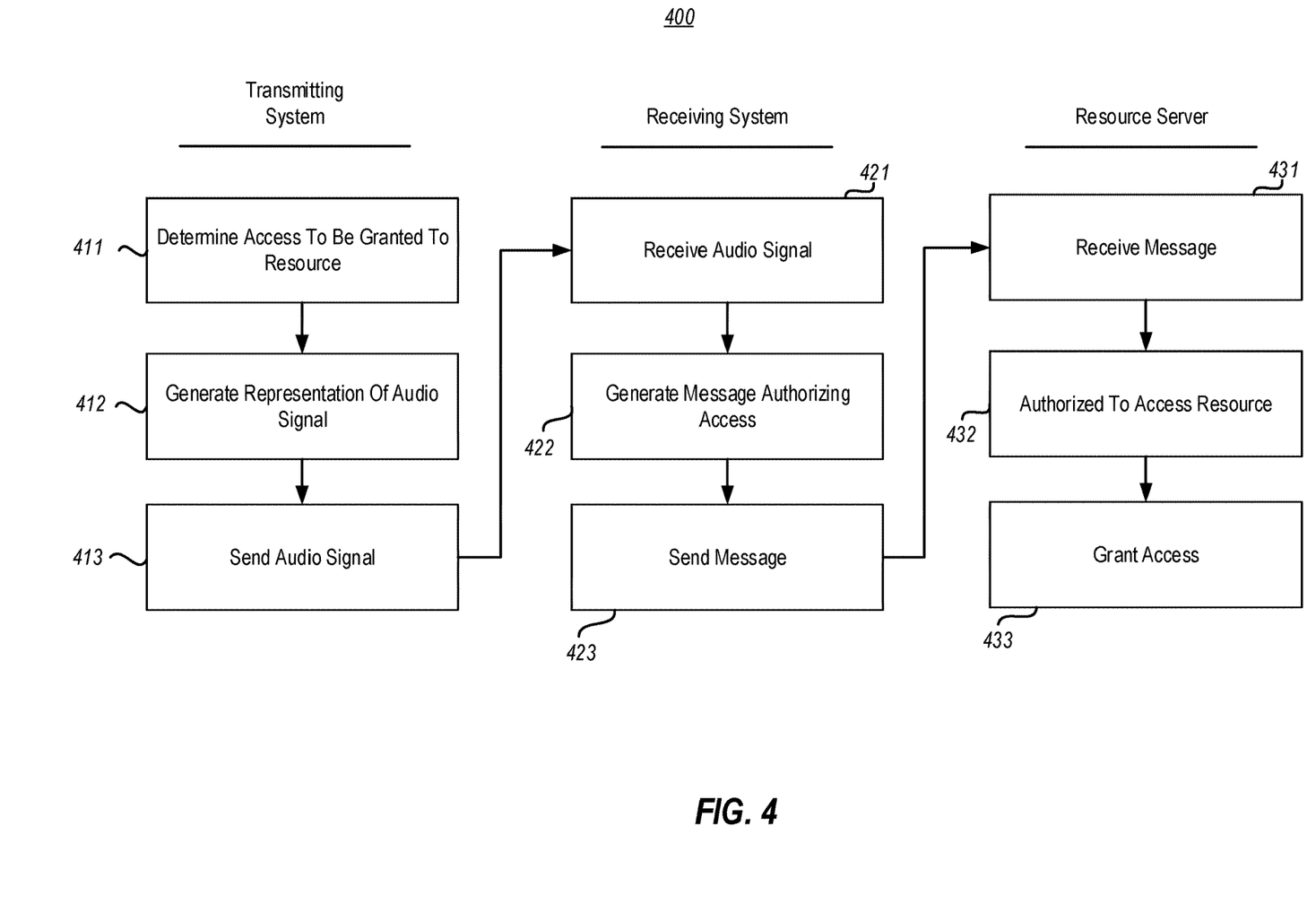
FIG. 4 illustrates a flowchart of a method for using an audio signal to grant a user of the computing system access to a resource, in accordance with the principles described herein.

FIG. 4 illustrates a flowchart of a method 400 for using an audio signal to grant a user of the computing system access to a resource, in accordance with the principles described herein. Acts that are performed by a transmitting computing system that sounds the audio signal (e.g., transmitting computing system 110 in FIG. 1) are represented in the left column of FIG. 4 under the heading "Transmitting System". Acts that are performed by a receiving computing system that receives the audio signal (e.g., receiving computing system 121 in FIG. 1) are presented in the middle column of FIG. 4 under the heading "Receiving System". Acts that are performed by the resource server computing system that regulates access to the resource (e.g., resource server computing system 130 in FIG. 1) are presented in the right column of FIG. 4 under the heading "Resource Server".

The transmitting computing system determines that a resource is to be granted to others (act 411). For instance, in FIG. 1, the transmitting computing system 110 may determine that access to resource 141 is to be granted. In the context of FIG. 3, this may cause the transmitting computing system 110 to send the initial data to the resource server computing system 130 (see arrow 151B), which may be used to determine which resource to grant to a receiving computing system upon that receiving computing system presenting access data for that resource.

The transmitting computing system then formulates a representation of an audio signal that corresponds to access to the resource (act 412). For instance, in the case of the method 200 of FIG. 2, the transmitting computing system 110 might generate an audio signal corresponding to the initial data provided (see arrow 151A of FIG. 1) by the resource server computing system 130.

If that initial data were an actual representation of the audio signal itself, this generation would be a trivial process of simply reading that initial data. If that initial data were some other initial data that the transmitting computing system may use to derive the audio signal, the transmitting computing system 110 then derives the audio signal. For instance, there might be four possible audio signals, each corresponding to a different resource 141 through 144. In that case, the initial data might be as short as two bits, that the transmitting computing system may used to look up the appropriate audio signal representation.

The audio signal is structured so as to be interpretable by a receiving computing system as input to generate access data. The receiving computing system may then use that access data to acquire access to the resource. More regarding this process will be described further below.

The transmitting computing system then causes its speaker to emit the audio signal (act 413). For instance, in FIG. 1, the transmitting computing system 110 causes the speaker 111 to emit the audio signal 101. The receiving computing system(s) then receive the audio signal from its microphone (act 421). For instance, in FIG. 1, the receiving computing systems 120 each receive the audio signal 101 at their respective microphones. As illustrated for receiving computing system 121, the receiving computing system 121 receives the audio signal 101 at its microphone 126.

In response to receiving the audio signal from its microphone, the receiving computing system formulates a message that is structured to represent to a resource server computing system that the receiving computing system has received the audio signal (act 422). In one embodiment, this representation is in the form of an access code that the resource server computing system recognizes as authorizing access to the respective resource.

Figure 7:
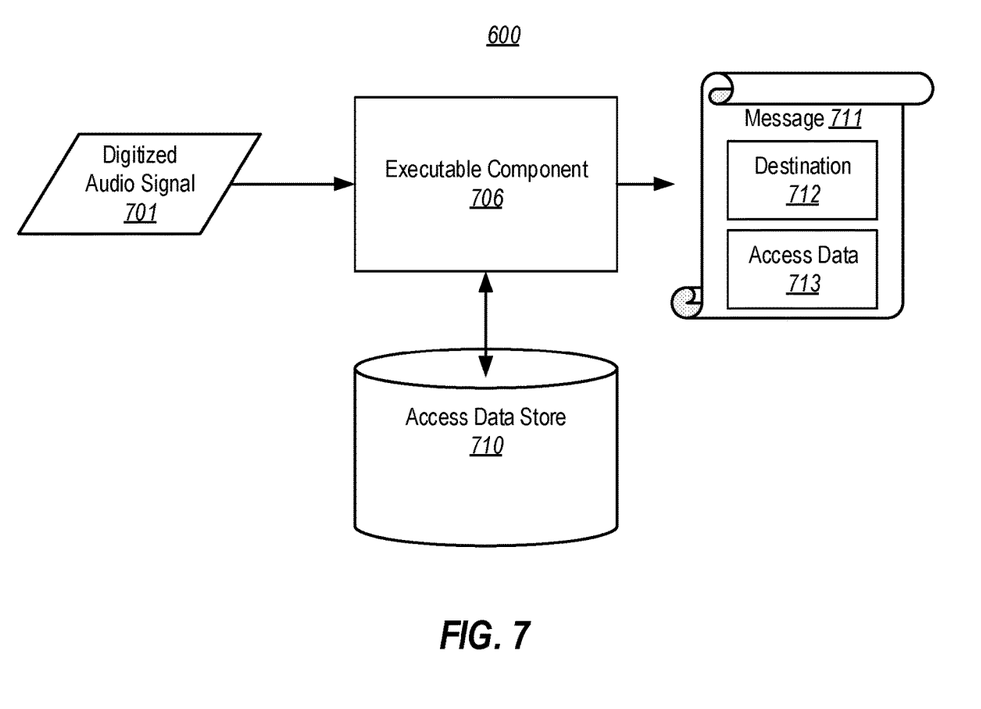
FIG. 7 illustrates a dataflow in which an executable component formulates a message that includes a destination address and access data, which may be executed on the receiving computing system.
Figure 8:
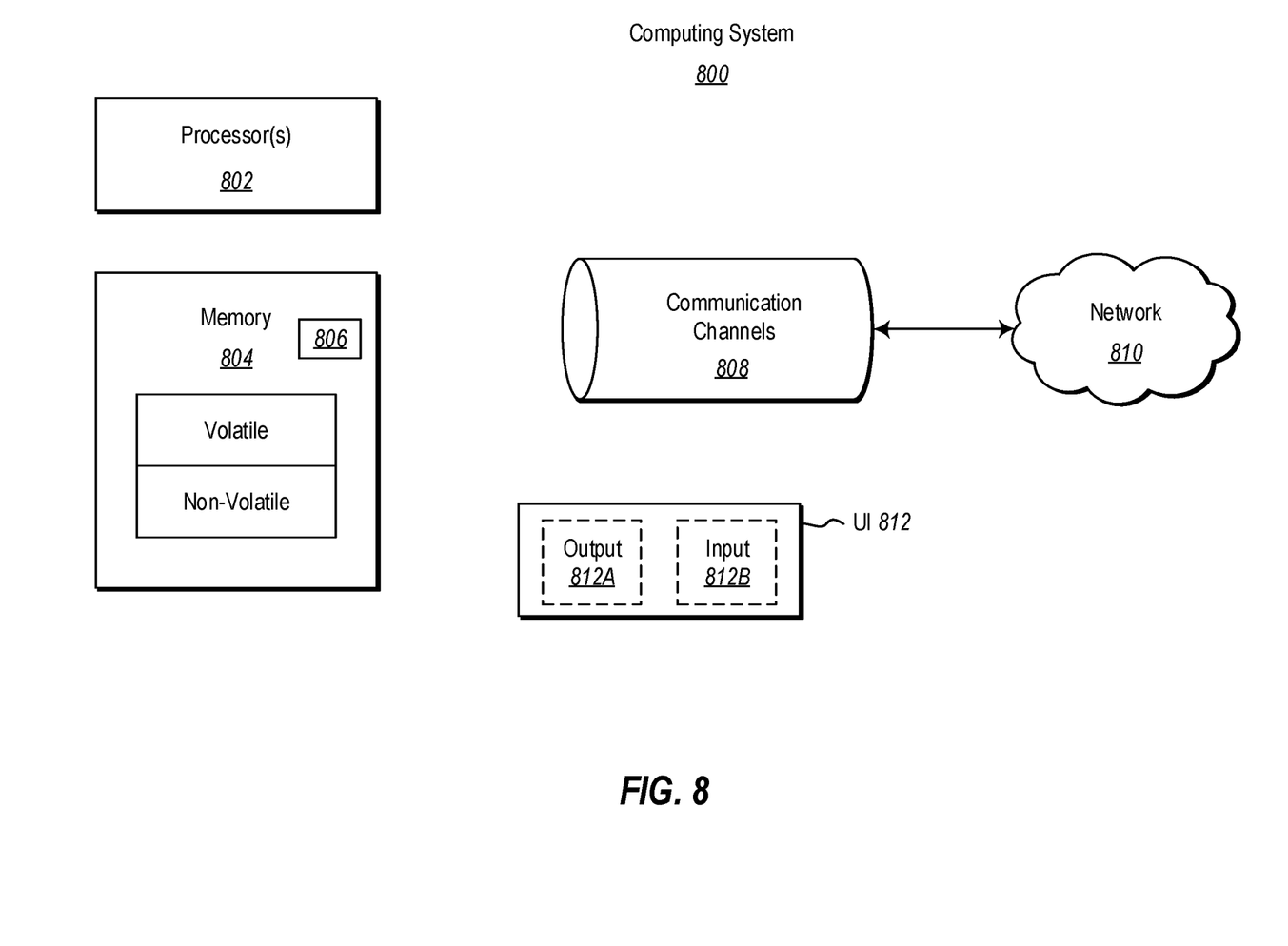
FIG. 8 illustrates an example computer system in which the principles described herein may be employed.

To illustrate, FIG. 7 illustrates a dataflow 700 in which an executable component 706 formulates a message 711 that includes a destination address 712 and access data 713. The executable component 706 formulates the message 711 using the digitized audio signal 701 received from the microphone of the receiving computing system. The executable component 706 may be present on each of the receiving computing systems 120 of FIG. 1, and may be structured as described below for the executable component 806.

In one embodiment, the executable component 706 is an integral part of the operating system of the receiving computing system. In another embodiment, the executable component 706 is an application that runs on the receiving computing system. In the latter case, the user T of the transmitting computing system might ask the users R1 through R3 to open that application on their respective receiving computing systems. In either case, if the microphone is not already enabled on each of the receiving computing systems, the user T might ask the users R1 to R3 to enable their microphone.

In one embodiment, the executable component 706 uses a matching function to match the received digitized audio signal against digital audio signals stored in an access data store 710. There will be some degradation of the received digitized audio signal as compared to the transmitted digitized audio signal due to limitations in the speaker of the transmitting computing system and in the microphone of the receiving computing system, and due to properties (e.g., echo, filtering, noise, and so forth) of the channel between the speaker and microphone. Nevertheless, a matching function will be able to account for normal variance to identify which audio signal was transmitted.

Based on the identity of this audio signal, the executable component 706 then determines the access data corresponding to that audio signal (and thus corresponding to the resource to be accessed). Thus, the executable component 706 may populate the message 711 with the access data 713. The access data 713 is structured to be interpretable by the resource server computing system as authorizing access to the resource. After all, the ability to generate the access data 713 evidences receipt of the audio signal.

The destination field 712 of the message 711 is the address of the resource server computing system (e.g., resource server computing system 130 in FIG. 1). In one embodiment, the destination field 712 is predetermined for each executable component 706. For instance, one application might be dedicated to listening for audio signals that allow access to resources to which access is regulated by only a single resource server computing system. On the other end of the spectrum, the destination field 712 may depend on the identifier of the audio signal itself. Thus, the identity of the resource server computing system may be at the same granularity as the identity of the audio signal.

The receiving computing system then transmits the message to the resource server computing system (act 423). For instance, referring to FIG. 1, each of the computing systems 120 may receive the audio signal (in act 421), generate the message (in act 422), and send the message to the resource server computing system (act 423). This sending is represented by arrow 152 in FIG. 1. The resource server computing system then receives each message (act 431).

Upon detecting such receipt, the resource server computing system interprets the message as representing that the receiving computing system received an audio signal or more generally is authorized to access the resource (act 432). For instance, if the message includes access data, that access data is compared against access data that would permit access to the resource. That access data might be a digital representation of the audio signal itself. Alternatively, the access data might be the same value as the initial data that was provided to the transmitting computing system in method 200 of FIG. 2, or that was provided to the resource server computing system in the method 300 of FIG. 3. In any case, that access data correlates to the audio signal received by the receiving computing system, and the receiving computing system offering that access data evidences that the receiving computing system indeed did hear the audio signal.

The resource computing system then grants the receiving computing systems (or its user) access to the resource (act 433). For instance, in FIG. 1, the receiving computing systems 120 are each granted access to the resource 141 that is owned by the user T of the transmitting computing system 110.

The method 400 may be performed in order to grant initial access to a resource. Alternatively, or in addition, the method 400 may be used to renew access previously granted to a resource. For instance, access to a resource might initially have some expiration time, with the method 400 being performed prior to that expiration in order to extend that expiration time.

Accordingly, the principles described herein permit access to resources using a sound signal. As the principles described herein may be enabled via the use of computing systems, an example computing system will now be described with respect to FIG. 8. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 8, in its most basic configuration, a computing system 800 typically includes at least one hardware processing unit 802 and memory 804. The memory 804 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 800 has thereon multiple structures often referred to as an "executable component". For instance, the memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface 812 for use in interfacing with a user. The user interface 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, holograms, virtual reality, and so forth. Examples of input mechanisms 812B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Traditionally, identity management systems are often built on centralized authorities including, but not limited to, employer directories, government organizations, email services, certificate authorities, and/or domain name registries. On the other hand, decentralized identities are identities upon which authentication may be performed in a decentralized system. Examples of such decentralized systems include a distributed ledger in which the decentralized identity may be recorded. Another example of a decentralized system includes a peer-to-peer system in which authentication is performed within the peer-to-peer system, allowing computing systems within the peer-to-peer system to then take action based on the authentication.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors;
a microphone; and
one or more computer-readable media having thereon computer-executable instructions that are structured such that, when executed by the one or more processors, cause the computing system to perform a method for using an audio signal to grant a user of the computing system access to a resource, the method comprising:

in response to receiving an audio signal from the microphone of the computing system, formulating a message that is structured to represent to a resource server that the computing system has received the audio signal, wherein a user of the computing system is to be granted access to a resource, by at least using a matching function to identify access data that is stored at the computing system prior to receiving the audio signal, as a result of the computing system receiving the audio signal;

causing the formulated message, including the access data stored at the computing system, to be transmitted to the resource server, the access data being used by a resource provider to control the granting of access to the resource; and in response to the transmission of the formulated message to the resource server, the user of the computing system being granted access to the resource.

2. The computing system in accordance with claim 1, the audio signal being at least partially in a range of 20 hertz (Hz) to 20 kilohertz (kHz).

3. The computing system in accordance with claim 1, the resource comprising membership in an electronic group, such that accessing the resource comprising joining the user into the electronic group.

4. The computing system in accordance with claim 3, the electronic group being selected from the group consisting of: an online meeting, an electronic collaboration account, a mailing list, a social media group, and a group.

5. The computing system in accordance with claim 1, the resource comprising a hardware resource.

6. The computing system in accordance with claim 5, the hardware resource comprising an output device.

7. The computing system in accordance with claim 6, the output device comprising a printer.

8. The computing system in accordance with claim 1, the resource comprising a drive.

9. The computing system in accordance with claim 1, the resource comprising a credential.

10. The computing system in accordance with claim 1, the resource comprising a web service.

11. The computing system in accordance with claim 1, the resource comprising data.

12. The computing system in accordance with claim 1, the resource comprising one or more configuration settings.

13. The computing system in accordance with claim 1, the resource comprising software.

14. A computing system comprising:
one or more processors;
a speaker;
one or more computer-readable media having thereon computer-executable instructions that are structured such that, when executed by the one or more processors, cause the computing system to perform a method for using an audio signal to grant at least one user of at least one other computing system access to a resource, the method comprising:

determining that access to a resource is to be granted to others;

formulating a representation of an audio signal that corresponds to access data that is stored at the at least one other computing system prior to the at least one other computing system receiving an audio signal, the representation of an audio signal being usable for obtaining access to the resource, the access data being used by a resource provider to control the granting of access to the resource; and causing the speaker to emit the audio signal, the audio signal being structured so as to be interpretable by the at least one other computing system as input to generate an access data message to the resource provider using the access data stored at the at least one other computing system for accessing the resource from the resource provider.

15. The computing system in accordance with claim 14, the method further comprising:

accessing the representation of the audio signal based on information received from the resource server.

16. The computing system in accordance with claim 14, the method further comprising:

notifying the resource server of data that represents the audio signal, access to the resource being granted to the user of the computing system that detects the audio signal.

17. A method for a transmitting computing system to using an audio signal emitted from a speaker of a transmitting computing system to grant at least one user of at least one other receiving computing system access to a resource, the method comprising:

the transmitting computing system determining that access to a resource is to be granted to others;

the transmitting computing system formulating a representation of an audio signal that corresponds to access data that is stored at the at least one other receiving computing system prior to the at least one other receiving computing system receiving the audio signal, the audio signal being usable for obtaining access to the resource, the access data being used by a resource provider to control the granting of access to the resource; and the transmitting computing system emitting the audio signal from a speaker of the transmitting computing system, the audio signal being structured so as to be interpretable by the at least one other receiving computing system as input to generate an access data message to the resource provider using the access data stored at the at least one other receiving computing system for accessing the resource from the resource provider.

18. The method in accordance with claim 17, further comprising:

accessing the representation of the audio signal based on information received from the resource server.

19. The method in accordance with claim 17, further comprising:

notifying the resource server of data that represents the audio signal, access to the resource being granted to the user of the computing system after the user hears the audio signal.

20. The method in accordance with claim 17, the audio signal comprising one that is at least partially in a range of 20 hertz (Hz) to 20 kilohertz (kHz), the resource comprising an online meeting.

21. The method of claim 17, wherein accessing the resource comprises joining an online meeting, such that in response to the transmission of the formulated message, a process is triggered for automatically joining the user to the online meeting.

22. The method of claim 17, wherein accessing the resource comprises joining an electronic collaboration account, such that in response to the transmission of the formulated message, a process is triggered for automatically joining the user to the electronic collaboration account.

23. The method of claim 17, wherein accessing the resource comprises joining a game, such that in response to the transmission of the formulated message, a process is triggered for automatically joining the user to the game.

24. The method of claim 17, wherein accessing the resource comprises joining a social media group, such that in response to the transmission of the formulated message, a process is triggered for automatically joining the user to the social media group.

25. The method of claim 17, wherein the audio signal is outside of an audible range of between 20 Hz and 20 kHz, such that the audio signal is transmitted at one or more of below 20 Hz or above 20 kHz.

* * * * *